Patented Apr. 17, 1945

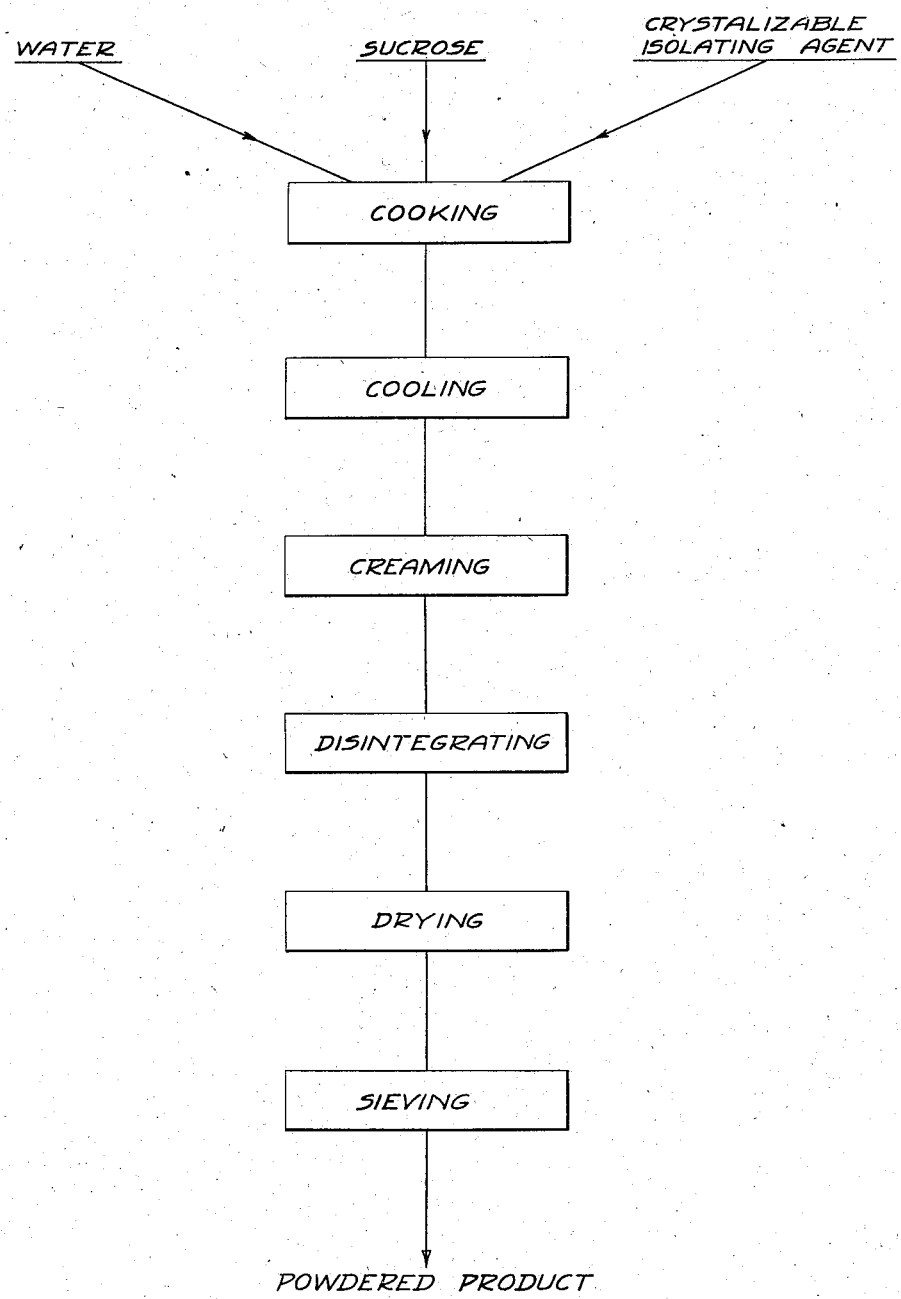

2,373,919

UNITED STATES PATENT OFFICE 2,373,919

SUGAR PRODUCT AND METHOD OF MAKING THE SAME

Mitchell F. Schweiger, Berkeley, Calif., assignor to J. D. & A. B. Spreckels Company, San Francisco, Calif., a corporation of California Application March 17, 1941, Serial No. 383,692

6 Claims. (Cl. 127—30)

My invention relates to a sugar product of the character known as powdered fondant, adapted to be reconstituted into a soft fondant by the simple addition of water. In the soft state the fondant is adapted for wide use, such as for icings on bakery goods and the like.

It is among the objects of my invention to provide an improved agent for isolating the sucrose crystals during the process of making the powdered fondant.

Another object is to provide a sugar product which, upon reconstitution into a soft fondant, provides a non-sticky icing for bakery goods, so that such goods may be wrapped without the icing adhering to the wrapping paper or other contiguous surface.

A further object is to provide an improved method of making the powdered fondant.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

The figure of the drawing is a flow sheet of my process.

Finely divided sugar products of the class known as powdered fondants have been produced in the past, and are adapted to be reconstituted into a soft fondant by simple addition of water and heat. The procedure commonly followed for making such powdered products comprises crystallizing sucrose in the presence of a colloidal or non-crystallizable isolating agent adapted to form a syrupy or gummy film or layer between the sucrose crystals to isolate or separate them and prevent their integral union or agglutination. The isolating agent also functions to control or retard the growth of the individual sucrose crystals. During the process a sugar solution containing the non-crystallizable isolating agent is cooked, then creamed by stirring, and after drying the mass is reduced to powder by grinding.

Such products have the advantages of being packageable for sale in the dry state, and of being adapted for reconstitution directly into a smooth fondant. When the water is added during the reconstituting step the syrup film between the sucrose crystals is dissolved and a smooth textured fondant of fine grain is produced without additional creaming.

The principal agents used in the past for isolating the sucrose crystals are colloidal or non-crystallizable materials such as invert sugar, commercial glucose (corn syrup), honey, caramel, gum arabic, dextrine, tragacanth and gelatine. It is to be noted that invert sugar is treated as a non-crystallizable material. Under ordinary conditions this is true, although under certain special conditions it is crystallizable in part. For purposes of this process, however, it is non-crystallizable.

A serious disadvantage of the powdered fondants heretofore made is that after being reconstituted and applied as an icing to bakery goods, the icing has a sticky quality which causes it to adhere to wrapping paper, thus creating a bad packaging problem for the bakery.

I have found that this stickiness is due in part to the colloidal or non-crystallizable character of the isolating agent employed. After careful analysis of the problem I discovered a new type of isolating agent for the sucrose crystals, which prevents agglutination of the crystals and controls their growth during manufacture of the powdered fondant; and produces a product which, after reconstitution, is not sticky. Bakery goods iced with my fondant may be wrapped without adherence to the wrapper or other contiguous surface.

In terms of broad inclusion, my sugar product comprises sugar crystals intergrown with a formation of isolating crystals interposed between the sugar crystals. My method of making the powdered fondant comprises preparing a solution containing sucrose and a crystallizable material adapted to isolate or separate the sucrose crystals, cooking the solution, cooling and creaming the mass, and then reducing the creamed mass to a granular state or powder. The solution is preferably cooked to remove the major portion of the moisture in the first instance, so that the mass may be disintegrated directly after creaming, without an intermediate drying step.

In greater detail, my method of making powdered fondant comprises preparing an aqueous solution of sugar such as sucrose, and a non-colloidal, crystallizable isolating agent. The isolating agent employed is preferably a crystallizable carbohydrate in the class including dextrose, maltose, lactose and xylose. For example, employing dextrose, I have used a solution made up of 9 parts by weight of granulated cane sugar (sucrose) and 1 part by weight of commercially pure dextrose, together with sufficient water to dissolve the two sugars. The amount of dextrose employed may vary from about 4% to 15% by weight to the total sugar content.

The solution is then cooked to about 280° F. to eliminate all but about 5% of the moisture. This initial cooking to a high temperature to eliminate the maximum amount of moisture at the beginning is an advantage because it is easier and cheaper to remove the water during the cooking step than at any other stage in the process. After cooking, the material is cooled to about 180° F. and then creamed into a smooth-grained fondant. During the fondant making process the sucrose and dextrose crystallize, and the dextrose performs a unique and unexpected function. Due to crystallization phenomenon not fully understood the sucrose crystals are intergrown with dextrose crystals; the dextrose forming a network or crystalline formation of still smaller crystals interposed between the sucrose crystals. This formation of secondary dextrose crystals associated with the primary sucrose crystals functions to isolate the sucrose crystals and prevent their agglutination, and also to control the growth of the sucrose crystals.

This is very different from the ordinary processes in which a colloidal or non-crystalline agent is employed to isolate the sucrose crystals by a syrupy or gummy film.

After creaming, the mass in my process is disintegrated. Because most of the water was removed during the initial cooking step, the mass creams to substantially dry lumps which may be disintegrated without an intermediate drying step. Disintegration may be accomplished in any suitable manner.

Since most of the water was eliminated during cooking, the material coming through the distintegrator is substantially dry. However, I prefer to pass the material through hot and then cold air to remove all but about .25% to .05% of the moisture; after which the material is screened to, say, 20-mesh and the fines are packaged. This super-dry product retains its powdery or granular form, even though subjected to some degree of moisture.

My improved product, as merchandized, thus comprises finely divided sugar particles including sucrose crystals isolated by crystalline networks of a crystallizable material intergrown between the sucrose crystals. When water is added to this powder for purposes of reconstitution, the minute isolating crystals are dissolved, thus separating the sucrose crystals into a soft, creamy fondant. It is to be noted that my product, either before or after reconstitution, has no colloidal or non-crystalline constituent to impart a sticky property. When corn syrup, invert sugar, or the like are used, such materials (while dried out in the process of making the powdered product) take up moisture again and the undesirable sticky property is restored. On the other hand, my non-colloidal crystallizable isolating agent produces a product which is reconstitutable into a substantially non-sticky fondant.

The powdered fondant produced by my process has excellent keeping properties, and a soft, creamy fondant of smooth grain may be had by merely mixing the powder in water with or without the addition of a little heat. The soft fondant, thus reconstituted, is as smooth textured as one embodying a colloidal or non-crystalline isolating agent; and my reconstituted product has the distinct advantage of not sticking to wrapping paper or other surface, thereby solving one of the most serious problems in connection with the handling of iced bakery goods.

Because of the absence of colloidal or non-crystallizable agents my powdered product, prior to reconstitution, has better keeping properties in the package; there being less tendency on the part of the powdered articles to gum together when subjected to moisture or pressure.

It is understood that the term "powder" as used herein is not limited to extremely fine particle sizes, but includes materials of more granular nature such as those which pass through say a 20-mesh screen.

I claim:

1. A sugar product comprising sucrose crystals intergrown with and isolated by dextrose crystals.

2. A sugar product comprising substantially dry sucrose crystals intergrown with and isolated by substantially dry crystals of sugar from the group consisting of dextrose, maltose, lactose and xylose.

3. The method of making a sugar product, which comprises preparing a solution containing sucrose and dextrose, said dextrose comprising from about 4% to 15% by weight of the total sugar content, cooking the solution to about 280° F., cooling it to about 180° F., creaming it, and then reducing it to a powder.

4. A powdered fondant-making product for packaging in the dry state and adapted to be converted into a soft fondant state by the addition of moisture without creaming, comprising a pre-cooked and creamed mass of sugar particles composed of sucrose crystals intergrown with isolating crystals of dextrose, said sucrose and dextrose being present in the ratio of about 9 to 1 by weight respectively, whereby said isolating crystals in the particles are dissolved upon the addition of moisture to free the sucrose crystals to provide a smooth textured and substantially non-sticky fondant.

5. The method of making a sugar product which comprises making a solution containing sucrose and dextrose in proportions in which the dextrose constitutes from about 4% to 15% by weight of total sugar content, cooking the mixture to such low water content that when subsequently creamed a crystallization of the sugars takes places in which substantially dry sucrose crystals are intergrown and isolated with a network of substantially dry dextrose crystals.

6. The method of making a sugar product which comprises making a solution containing sucrose and dextrose in proportions in which the dextrose constitutes from about 4% to 15% by weight of total sugar content, cooking the mixture to about 280° F., then cooling and creaming it to cause a crystallization of the sugars in which the sucrose crystals are intergrown and isolated with a network of dextrose crystals.

MITCHELL F. SCHWEIGER.